United States Patent
Creasey et al.

(10) Patent No.: US 7,964,015 B2
(45) Date of Patent: *Jun. 21, 2011

(54) METAL EXTRACTION WITHOUT CYANIDE

(75) Inventors: David H. Creasey, Boerne, TX (US); Edwin B. Smith, Jr., Houston, TX (US)

(73) Assignee: Contact Marketing Solutions, LLC, Danbury, CT (US)

(*) Notice: Subject to any disclaimer, the term of this patent is extended or adjusted under 35 U.S.C. 154(b) by 106 days.

This patent is subject to a terminal disclaimer.

(21) Appl. No.: 12/411,570

(22) Filed: Mar. 26, 2009

(65) Prior Publication Data

US 2009/0272227 A1    Nov. 5, 2009

Related U.S. Application Data

(63) Continuation-in-part of application No. 11/765,868, filed on Jun. 20, 2007, now Pat. No. 7,648,643.

(60) Provisional application No. 61/040,220, filed on Mar. 28, 2008.

(51) Int. Cl.
  *C22B 3/06* (2006.01)
(52) U.S. Cl. ............... 75/739; 75/741; 75/743; 75/744; 252/183.11; 252/183.14
(58) Field of Classification Search .................. 75/739, 75/743, 741, 744
See application file for complete search history.

(56) References Cited

U.S. PATENT DOCUMENTS

| | | | |
|---|---|---|---|
| 4,192,851 A * | 3/1980 | Hirsch et al. | 423/28 |
| 5,205,858 A | 4/1993 | Manke | |
| 5,232,490 A | 8/1993 | Bender et al. | |
| 5,989,595 A * | 11/1999 | Cummins | 424/710 |
| 6,972,107 B2 | 12/2005 | Marsden et al. | |
| 7,648,643 B1 * | 1/2010 | Creasey | 252/183.11 |
| 2003/0039605 A1 | 2/2003 | Ramsay | |
| 2003/0075021 A1 * | 4/2003 | Young et al. | 75/743 |
| 2007/0119277 A1 * | 5/2007 | Russell et al. | 75/712 |

* cited by examiner

*Primary Examiner* — George Wyszomierski
*Assistant Examiner* — Tima M McGuthry-Banks
(74) *Attorney, Agent, or Firm* — Brian S. Steinberger; Joyce P. Morlin; Law Offices of Brian S. Steinberger, P.A.

(57) ABSTRACT

An improved process and composition for the extraction of metal from a metal-laden ore, soil or rock is provided. A liquid, three-component aqueous lixiviant comprises water, an alkali metal salt and a low pH acidic composition. A four-component aqueous lixiviant comprises water, a low pH acidic composition, an alkali metal salt and an acid having a pH value less than 2. Both lixiviant compositions are efficient for extracting metal into a pregnant liquid solution. The pregnant solution is treated by known conventional means, such as filtration, centrifuging or electrolysis to remove the extracted metals. The three-component and four-component aqueous lixiviants of the present invention are non-toxic, meaning, not an irritant or deleterious to humans or the environment and perform, as well as, or better than known toxic cyanide lixiviants. The aqueous lixiviants of the present invention effectively and efficiently extract gold, silver, platinum and other metals from ore laden soil or rock with efficiencies greater than 90%.

19 Claims, 2 Drawing Sheets

METAL EXTRACTION WITHOUT CYANIDE

This invention claims the benefit of priority from U.S. Provisional Application Ser. No. 61/040,220 filed Mar. 28, 2008, and is a continuation-in-part of U.S. patent application Ser. No. 11/765,868 filed Jun. 20, 2007, now U.S. Pat. No. 7,648,643, both Application Ser. No. 61/040,220 and U.S. Pat. No. 7,648,643 are incorporated herein by reference.

FIELD OF THE INVENTION

The present invention relates generally to a process and composition effective for extracting precious metals, and more specifically, to a lixivant composition and process that is not an irritant of deleterious to humans and the environment, and suitable for replacing toxic cyanide compounds currently used in extracting metals from metal-containing ore.

BACKGROUND AND PRIOR ART

Most metal recovery processes use aqueous solution extraction. Unfortunately, the aqueous extraction solutions usually contain toxic, caustic and harsh chemicals, such as cyanide, hydrochloric acid, sulfuric acid that form water soluble complexes with metals.

Within the past fifty years, cyanide has remained one of the most common chemical compounds used in the processes for recovery of metals from ore. Cyanide has the great ability to form water soluble complexes with metals. It achieves this via the fact that the cyanide molecule has what is called a triple bond between the carbon and nitrogen atoms. This special bond makes the cyanide molecule very reactive and it easily forms cyano-metallic complexes such as potassium gold cyanide ($KAu(CN)_2$), sodium zinc cyanide ($Na_2Zn(CN)_4$) and sodium copper cyanide ($Na_3Cu(CN)_4$).

Most people know of cyanide as a dangerous, lethal chemical, and, without a doubt it can be dangerous if it is not treated appropriately. Humans can be subjected to the effects of cyanide via ingestion, inhalation, or absorption through the skin. In essence, upon intake of the cyanide, cellular asphyxiation occurs via binding of the iron in the cytochrome C oxidase enzyme. With the iron bound up by the cyanide, the human body cannot property utilize oxygen, the individual actually suffocates from oxygen starvation. Cyanide levels in the tailings (discharged waste) pond should be reduced to 50 milligrams per liter or less to avoid wildlife mortalities. Cyanide levels above 100 milligrams/liter can cause bird and other wildlife mortalities.

Hydrogen cyanide (HCN) is converted to calcium or sodium cyanide for mining purposes and shipped to the mine site, usually in briquette form. The solid cyanide briquettes are added to a tanked mixture of finely crushed ore and water and let stir for a period of many hours. The solid cyanide dissolves in the water portion of the mixture, attacks or leaches the metal in the ore, and forms the water soluble complex. Thus, the metal is extracted from a solid state (in the ore) to a liquid state (in the solution).

FIG. 1 is a schematic illustration of a traditional batch process using an aqueous cyanide solution to leach metals from metal-containing ores.

After a metal has been put in solution or liquefied, it is subjected to electrowinning, also called electro-refining or electroextraction. Electrowinning is the electrodeposition of metals from their ores onto a plate or wire mesh; this is an important technique that allows purification of a non-ferrous metal in an economical and straightforward step.

Various patents claim improvements in metal recovery and electrorefining processes developed since 1865 when a commercial process for electrolytic copper refining was patented by James Elkington.

U.S. Pat. No. 5,232,490 to Bender et al. uses an oxidation/reduction process for recovery of precious metals, such as silver and gold, from manganese dioxide ores, sulfidic ores and carbonaceous materials. The process involves leaching the ore with a leach liquor comprising an acid, such as hydrochloric acid (HCl) and sulfuric acid in the presence of a reductant to dissolve the precious metals. Recovery of the dissolved precious metals in the fluid can be by electrolysis.

U.S. Pat. No. 5,205,858 to Manke describes a precious metals recovery process using the standard cyanide-extraction technique together with carbon adsorption to facilitate the recovery.

U.S. Pat. Publ. No. 2003/0039605 A1 to Ramsay discloses a process for recovering precious metals from fine carbon bearing residual amounts of precious metals. The process involves incinerating carbon followed by a method for separating the precious metals from carbon ash; separation could include cyanidation, gravity concentration, smelting, electrowinning and solvent extraction.

U.S. Pat. No. 6,972,107 B2 to Marsden et al. describes a system for direct electrowinning of copper from a leach solution of a copper-containing ore, concentrate, or other copper-bearing material without the use of copper solvent extraction techniques or apparatus.

FIG. 1 shows a prior art batch process for recovering valuable minerals, such as, gold using an aqueous cyanide solution 4 to leach gold from an ore 1 that is crushed and/or ground 2 before it is conveyed to a filtration bed 3 consisting of a vault of pelletized fly ash (ground metal ore) containing gold. The cyanide solution 4 extracts the gold from the ore into the solution from which the valuable minerals (gold) are removed 5. The mineral extract is concentrated and refined for purification 6 and a toxic cyanide waste 7 is left for disposal and further handling to prevent damage to the environment. This process has a metal recovery rate between approximately 32% to approximately 37%, with many negative environmental and health impacts due to the use of cyanide and caustic materials.

The use of cyanide in processing also generates significant amounts of cyanide by-products that take time to degrade, notably cyanate and thiocyanate, and metal complexes of cyanide. The exact toxicities, residence time, and impacts on aquatic organisms are still poorly understood. It is common for regulatory agencies to omit monitoring for these compounds in the discharges from mines, partially because there is so little known about them.

None of the prior art processes for recovery of metals from ore use non-caustic compositions to extract metal from its ore. All of the processes have complicated, hazardous, costly processing steps. Many of the processes have disastrous consequences to the environment where the processes are performed. There is a need for a lixiviant that is non-irritant or non-deleterious to humans and the environment. There is also a need for an environmentally friendly, efficient process for recovering metals from ore that also conserves natural resources. The present invention fulfills the needs not met by the prior art and provides an improvement in the metal extraction efficiency of a commonly owned U.S. patent application Ser. No. 11/765,868 filed on Jun. 20, 2007.

SUMMARY OF THE INVENTION

A first objective of the present invention is to provide an improved lixiviant that is not an irritant or deleterious to humans and the environment for extracting metals from a metal-containing ore.

A second objective of the present invention is to provide an improved lixiviant that is not an irritant or deleterious to humans and the environment for extracting metals from a metal-containing ore at a recovery rate between 85% and 97% of total metal in the ore.

A third objective of the present invention is to provide an improved lixiviant that is not an irritant or deleterious to humans for recovering metals from ore that has no negative environment impact and no harmful health impact on workers.

A fourth objective of the present invention is to provide a three-component aqueous lixiviant that is a suitable replacement for cyanide in metal recovery processes.

A fifth objective of the present invention is to provide a four-component aqueous lixiviant that is a suitable replacement for cyanide in metal recovery processes.

A sixth objective of the present invention is to provide an improved continuous or batch process for recovering metals from an ore laden soil or rock using a lixiviant that is not an irritant or deleterious to humans and the environment for extracting metals from ore at a recovery rate between 85% and 97% of total metal in the ore.

A first embodiment of an improved process for the recovery of metal from a metal-containing ore, soil or rock, includes selecting a metal-containing ore, crashing the metal-containing ore to form a powder, conveying the powder to a mixing vat, adding an amount of a three-component lixiviant that consists of a liquid that is not an irritant or deleterious to humans and the environment, consisting essentially of, low pH acidic composition (LpHAC), an alkali metal salt and water to form an aqueous slurry, extracting metals from the slurry to form a pregnant liquid and a solid residue, conveying the pregnant liquid and solid residue to a solid/liquid separator, removing solids from the pregnant liquid and solid residue, directing the pregnant liquid to a metal recovery unit, and collecting a high purity metal.

The metal-containing ore used in this process contains copper, silver, gold, platinum, uranium, and rhodium, preferably gold and copper.

The three-component lixiviant of the present invention consists of water, an alkali metal salt selected from at least one of potassium chloride, potassium sulfate, magnesium chloride, magnesium sulfate, calcium chloride, calcium sulfate, manganese chloride, manganese sulfate, sodium chloride, sodium sulfate, ammonium chloride, ammonium sulfate, ammonium bisulfate and a liquid, low pH acidic composition prepared by the process of combining a high purity sulfuric acid with water and an ammonium compound, heating the mixture to approximately 140° F. to form mixture (I), placing mixture (I) in a pressurized vessel and heating the mixture to temperatures in a range between approximately 250 F and approximately 400 F, then, cooling the mixture, after the mixture is cooled, adding a stabilizing amount of the starting mixture (I). Preferably, the alkali metal salt is potassium chloride.

The processing step of crushing the metal-containing ore uses at least one of a rock crusher and a ball crusher. The step of collecting a high purity metal includes at least one of filtering, centrifuging, electrolysis, and fluid bed extractor and the metal recovery unit is a centrifuge, electrolysis unit, molecular sieve, and fluid bed extractor, preferably, an electrolysis unit.

The ratio of three-component lixiviant to water in the aqueous slurry is in a range of from approximately 10% to approximately 90% lixiviant and approximately 90 weight % to approximately 10 weight % water.

A composition of matter that extracts metal ions from a metal containing ore is prepared by combining water, an alkali metal salt, and a product produced by the process of combining a high purity sulfuric acid with water and an ammonium compound, heating the mixture to approximately 140° F. to form mixture (I), placing mixture (I) in a pressurized vessel and heating the mixture to temperatures in a range between approximately 250 F and approximately 400 F, then, cooling the mixture, after the mixture is cooled, adding a stabilizing amount of the starting mixture (I).

The composition includes an alkali metal salt selected from at least one of an alkali metal chloride and an alkali metal sulfate; me preferred alkali metal chloride is potassium chloride.

The metal-containing ore contacted by the extraction composition contains metals selected from at least one of copper, silver, gold, platinum, uranium and rhodium.

The composition of matter that extracts metal tons from a metal containing ore, consists of an amount of the LpHAC and alkali metal salt in a range from approximately 10 weight % to approximately 15 weight % LpHAC and approximately 5 weight % to approximately 10 weight % of an alkali metal salt in me extracting solution with the remaining weight % Of the solution being water.

A second embodiment of an improved process for the recovery of metal from a metal-containing ore, soil or rock, includes selecting a metal-containing ore, crushing the metal-containing ore to form a powder, conveying the powder to a mixing vat, adding an amount of a four-component aqueous lixiviant that consists essentially of water, a liquid, non-irritant, low pH acidic composition (LpHAC), an alkali metal salt and an acid having a pH of less than approximately 2, to form an aqueous slurry, extracting metals from the slurry to form a pregnant liquid and a solid residue, conveying the pregnant liquid and solid residue to a solid/liquid separator, removing solids from the pregnant liquid and solid residue, directing the pregnant liquid to a metal recovery unit, and collecting a high purity metal.

The process of the second embodiment uses metal-containing ore that contains at least one of copper, lead, molybdenum, cadmium, nickel, silver, cobalt, zinc, gold, platinum, uranium, rhodium, and aluminum, preferably gold and copper.

The four-component aqueous lixiviant of the second embodiment consists of water, an acid having a pH of less than approximately 2, an alkali metal salt selected from at least one of potassium chloride, potassium sulfate, magnesium chloride, magnesium sulfate, calcium chloride, calcium sulfate, manganese chloride, manganese sulfate, sodium chloride, sodium sulfate, ammonium chloride, ammonium sulfate, ammonium bisulfate, and a liquid, low pH acidic composition prepared by the process of combining a high purity sulfuric acid with water and an ammonium compound, heating the mixture to approximately 140° F. to form mixture (I), placing mixture (I) in a pressurized vessel and heating the mixture to temperatures in a range between approximately 250 F and approximately 400 F, then, cooling the mixture, after the mixture is cooled, adding a stabilizing amount of the starting mixture (I).

The preferred alkali metal salt of the second embodiment is potassium chloride and the acid with a pH of less than 2 is selected from at least one of nitric acid, hydrofluoric acid, hydrochloric acid, fumeric acid, and mixtures thereof, preferably nitric acid and hydrochloric acid.

The improved metal extracting solution (lixiviant) of the present invention has two embodiments and both embodiments include a low pH acid composition as a basic component that renders the lixiviant non-irritating and not deleterious to humans and the environment.

Further objects and advantages of this invention will be apparent from the following detailed description of presently described embodiments, which are illustrated in the accompanying drawings.

DESCRIPTION OF THE EMBODIMENTS

Figure 1:
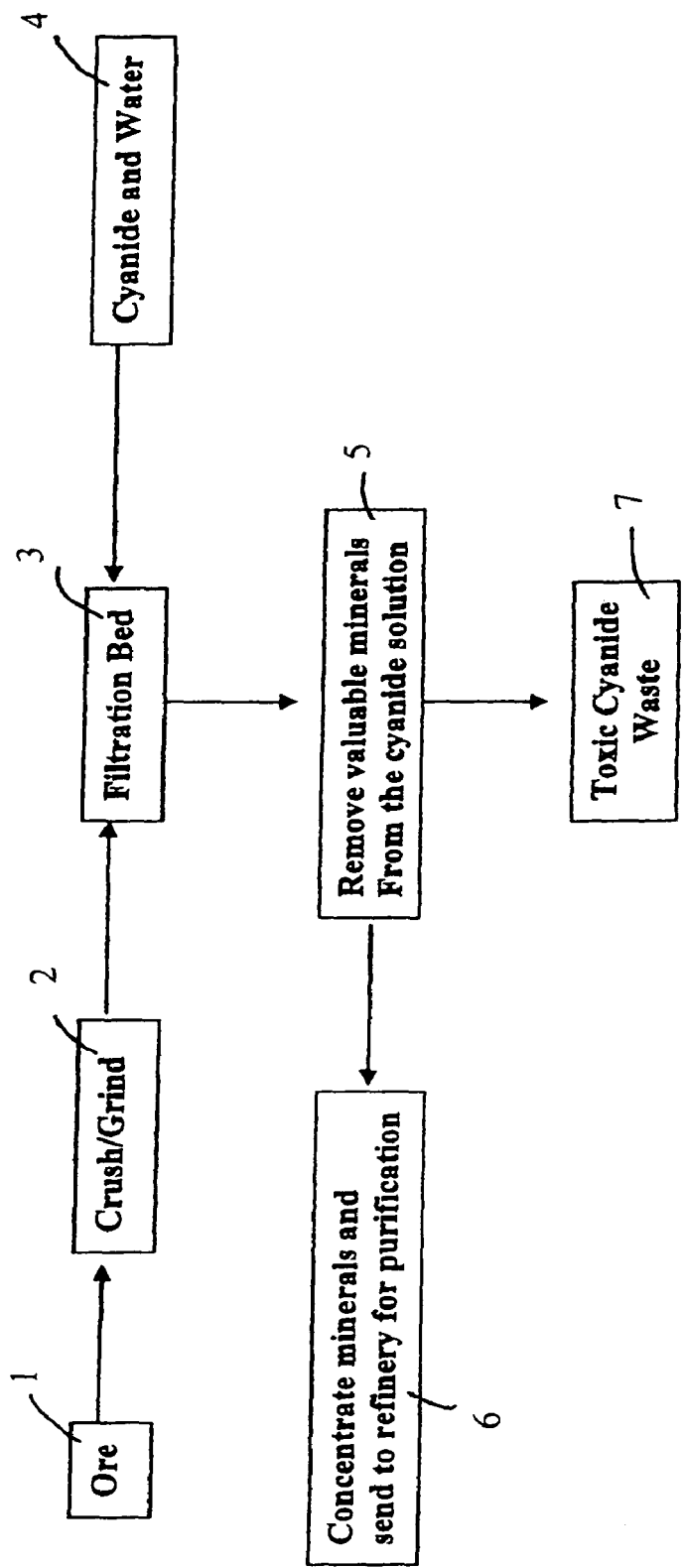
FIG. 1 is a schematic illustration of a traditional batch process using an aqueous cyanide solution to leach the metal from metal-containing ores. (Prior Art)

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

It would be useful to discuss the meanings of some words used herein and their application before discussing the compositions of matter and methods of using a novel lixiviant in a metal extraction process.

"Lixiviant" is used herein to refer to a liquid medium used in hydrometallurgy to selectively extract the desired metal from an ore or mineral. The lixiviant assists in rapid and complete leaching or extracting. Metal is recovered from the lixiviant in a concentrated form after leaching.

"Metal recovery" is used herein to refer to recovery Of precious metals, including gold, silver and the platinum group family, such as, iridium, palladium, rhodium, osmium, and ruthenium; other industrially useful metals including lead, copper, zinc, aluminum, chromium, cobalt, manganese and the rare-earth, alkali, and alkaline metals.

"LpHAC" is used to refer to Low pH acidic composition, a composition of matter claimed in U.S. Pat. Nos. 5,989,595 and 6,242,001 B1 to Cummins and incorporated herein by reference.

"LpHAC+1" is used herein to refer to the two-component lixiviant for metal extraction that consists of a low pH acidic composition referenced above and water.

"LpHAC+2" is used herein to refer to the three-component lixiviant for metal extraction that consists of an alkali metal salt, a low pH acidic composition referenced above, and water.

"LpHAC+3" is used herein to refer to the four-component lixiviant for metal extraction that consists of an alkali metal salt, a low pH acidic composition referenced above, a mineral acid, and water.

"Mineral acid" is used herein to refer to acids having a pH value of less than 2, which includes, but is not limited to, nitric acid, hydrofluoric acid, hydrochloric acid and fumeric acid.

"Non-toxic" is used herein to mean not an irritant or deleterious to humans or the environment when used in quantities and weight ratios specified herein for metal extraction.

In U.S. Pat. Nos. 5,989,595 and 6,242,011 B1 to Cummins, a low pH acidic composition of matter is disclosed that is useful for destroying microorganisms that spoil food, such as fish. The composition of matter, patented by Cummins, is also useful for skin treatment of melanoma and the treatment of other bacteria, and serves as the basic component for the novel metals recovery reagent of the present invention. LpHAC has the effect of rendering the liquid lixiviant harmless to higher life forms, human tissue and causes the resulting chemical mixture to have low toxicity properties. After the lixiviant of the present invention is used for metal extraction, it is neutralized and can be disposed of as a fertilizer product, or redeveloped for reuse in the metal extraction process.

In general, the process for preparing LpHAC that is not an irritant or deleterious to humans includes combining a strong, low pH acid, selected from at least one of, 98% purity sulfuric acid, phosphoric acid, fumaric acid or acetic acid with water, preferably distilled water, deionized water, filtered water or the like and an ammonium compound to provide mixture (I), combining mixture (I) in a pressurized vessel and heating the mixture to temperatures in a range between approximately 250 F and approximately 800 F, then cooling the mixture, after the mixture is cooled, adding a stabilizing amount of the starting mixture (I). The ammonium compound is preferably anhydrous ammonia, ammonium sulfate, and buffered ammonium nitrate used in a ratio of approximately 1 lb. to approximately 5 lbs. of ammonium compound per gallon of water in mixture (I). A metallic sulfate, such as sodium sulfate, magnesium sulfate, zinc sulfate, manganese sulfate, and copper sulfate can be substituted for the ammonium compound in the process for making the LpHAC used herein.

The following physical and chemical properties of the low pH acidic composition used in the present invention are observed when undiluted.

pH=−3; liquid, color is clear; specific gravity is < than 3 preferably in a range from approximately 1.4 to approximately 1.84.

When diluted, the aqueous based fluid of the present invention may generally be composed of any water that is compatible with the extraction process. Preferably, the aqueous fluid is selected from the group comprising fresh water, sea water, brine, mixtures of water and non-toxic water soluble organic compounds, or mixtures thereof.

The amount of the aqueous fluid of the present invention will vary, depending on the metals recovery application and the nature of the conditions of the metallic ore, soil or rock. Different ores have different properties and may require different acids or combinations of materials based on the ore content. For example, refractory sources of precious metals include ores wherein the previous metals are bonded to minerals in the ore. Even direct cyanidation is ineffective to break these bonds in any substantial degree. Other types of ores are refractory because precious metals are chemically bound or encapsulated in other minerals.

Typically, the amount of the LpHAC and alkali metal salt in the three-component lixiviant is preferably in a range from approximately 10 weight % to approximately 18 weight % LpHAC and approximately 5 weight % to approximately 15 weight % of an alkali metal salt in the extracting solution with the remaining weight % of the solution being water.

As a metal extractant, the three-component lixivant of the present invention removes from 85 to 92% of the gold, silver, or platinum from an ore containing 0.5 to 1.5 ounces per ton of gold: 0.8-1.3 ounces of platinum, and traces of silver.

The extraction processes and lixiviant of the present invention provide an improved recovery rate in a range of approximately 90%-97% recovery of a high purity metal directly from metal laden soil and rock and the lixiviant is non-corrosive, non-caustic, non-irritating, not harmful to human tissue and the environment; it also causes no harm to workers or the environment, as reported in the commonly owned application Ser. No. 11/765,868.

Figure 2:
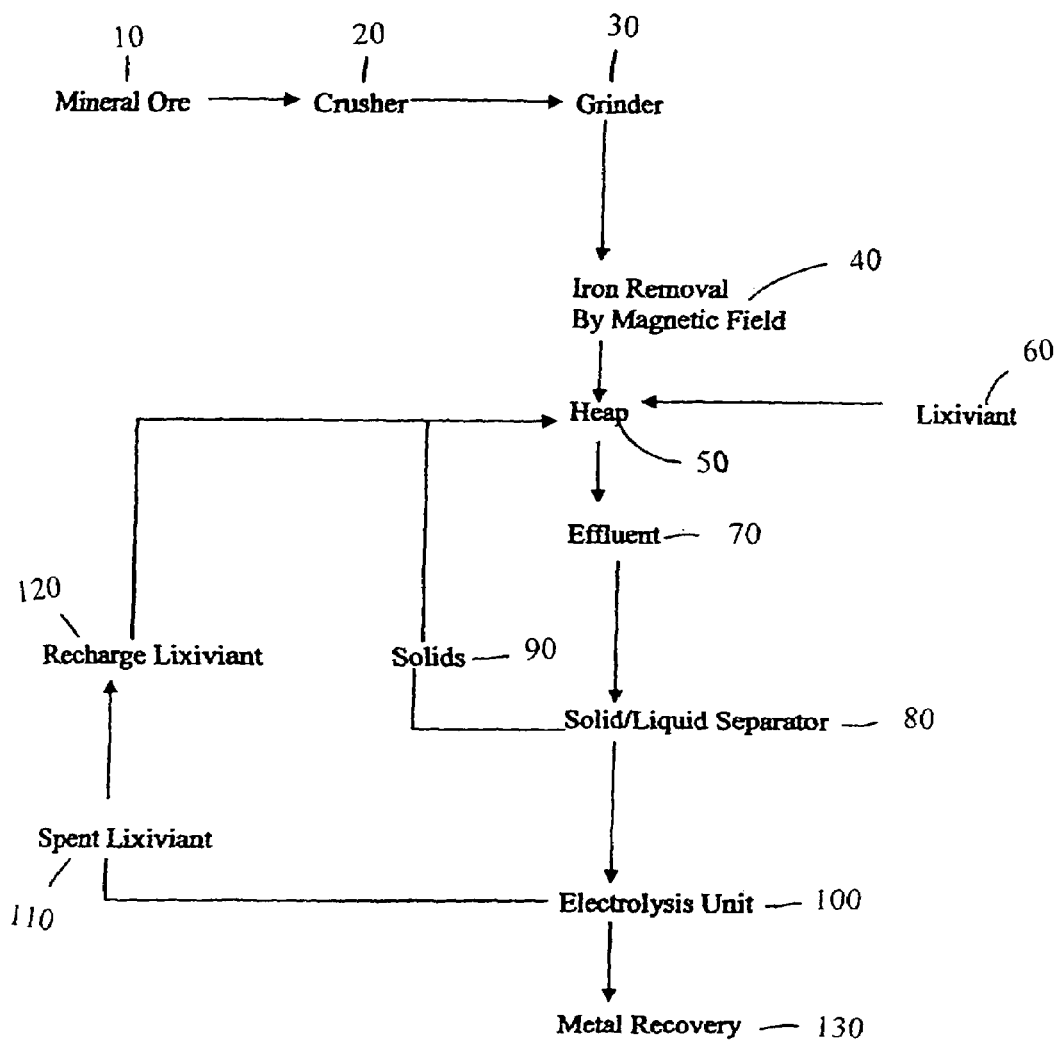
FIG. 2 is a flow chart of the metal extraction process using the lixiviant of the present invention.

For purposes of illustrating the present invention, but not as a limitation, a general description of a metal extraction process is shown in FIG. 2. The extraction process begins with a mineral-laden ore 10 that is fed to a crusher 20, then to a grinder 30, thereafter iron is removed by passing the ground mineral ore through magnetic field 40. The crushed and ground mineral ore with iron removed is collected in a heap 50. A stream of the aqueous lixiviant of the present invention 60 is added to the heap 50 to form a liquid slurry which becomes an effluent 70, that is fed to a solid/liquid separator 80. The solid/liquid separator 80 separates solids 90 that are returned to the heap 50 for further extraction of metals and the liquid (known in the art as a "pregnant liquid") is directed to an electrolysis unit 100. A stream of spent lixiviant 110 leaves the electrolysis unit 100 and is directed to a chamber for recharging; the recharged lixiviant 120 is returned to heap 50. As the spent lixiviant is removed from the electrolysis unit 100, the extracted metal is recovered in substantially pure form 130, literally providing a "pot of gold."

The lixiviant of the present invention is most effective in a slurry application, but is also useful in a leach field application.

First Embodiment

In a first embodiment, there are three components in the lixiviant: a low PH acid composition of matter, an alkali metal salt and water used in the weight ratios shown in Table I below.

TABLE I

Composition of LpHAC + 2

| Compound | Weight Percent Range | Preferred Weight Percent |
|---|---|---|
| Low pH acid product (LpHAC) | 10-50 | 10-18 |
| Potassium chloride (KCl) | 5-28 | 5-15 |
| Water | 22-85 | 67-85 |

The first component is the low pH acid prepared by the process disclosed in U.S. Pat. Nos. 5,989,595 and 6,242,011 B1 to Cummins which shows no toxicity when neutralized with sodium hydroxide as shown in Example I below. The use of chemical compositions in marine and estuarine waters is considered highly sensitive and stringent regulatory procedures stated in 40 Code of Federal Regulations (CFR) 300 Appendix C, regarding dispersant toxicity is used to determine the toxicity of the low pH acidic composition used in the present invention.

Example I

Determining Toxicity of low pH Acid Composition (LpHAC) to Saltwater Organisms

The low pH acidic composition is first neutralized with sodium hydroxide to a pH of 7.2 because regulatory requirements prohibit the dumping of any substance having a pH below 2, so the low pH acidic composition is neutralized prior to determining toxicity. The neutralization to pH 7.2 is a pre-treatment step that occurs prior to disposal of the lixiviant into an environment, such as land, ocean, rivers, streams or the like.

Twenty-four, forty-eight, seventy-two and ninety-six hour biomonitoring of the mortality of salt water organisms was conducted as follows. Synthetic laboratory water is prepared from Instant Ocean and used as receiving water. No pretreatment or sample preservation was employed. The sample is a thin liquid that is clear with a slight yellow color and is diluted 1:1000 with the diluent water for testing purposes.

Test Methods

The toxicity of the low pH acid solution was tested by the method specified in 40 CFR 300, Appendix C For Surface Dispersants. Death of the test organisms was the adverse effect 600 milliliter (ml) size glass beakers were used for the *Mysidopsis bahia* (5 day old) and *Menidia beryllina* (7 day old) test organisms. The 600 ml beakers were each filled with 500 ml of test solution.

Each test is begun by filling the beakers with the following low pH Acid dilutions: 0 mg/L; 10 mg/L; 18 mg/L; 32 mg/L; 56 mg/L; and 100 mg/L. Synthetic laboratory saltwater diluent is used. The beakers are then placed in a 36 inch square forced circulation water bath cooled to 25.0±0.1° C. Test organisms are added immediately. After one hour, the water temperature in various test beakers is tested and all are found to be 25.0° C.

Feeding is 50 artemia nauplii per 24 hours per survivor. Aquaria and room are held at 25±1° C. (approximately 77° F.). Death is the adverse effect, determined by cessation of glass rod simulated movement. Dead species are removed daily by use of a serological pipet. Reduced motility is not considered. No drugs or other treatments are used during the test organisms' lifetimes.

Dodecyl sodium sulfate is used as the reference toxicant for both species. The LC50 (Lethal Concentration 50, the concentration of a chemical which kills 50% of a sample population) values are: *Mysidopsis bahia* 0.98 mg/L and *Menidia beryllina* 1.14 mg/L. The LC50 values are in keeping with the laboratory norms of 1.00 mg/L±0.23 for both species.

The test used ten animals for replicate, with five replicates per test level of chemical composition; fifty (50) organisms per concentration level. A summary of mortality information is reported in Table II below:

TABLE II

*Mysidopsis bahia* Survival

| REPLI-CATE | PERCENT SURVIVAL | | | | | |
|---|---|---|---|---|---|---|
| | 0 mg/L | 10 mg/L | 18 mg/L | 32 mg/L | 56 mg/L | 100 mg/L |
| A* | 100 | 90 | 90 | 100 | 100 | 90 |
| B* | 100 | 100 | 100 | 90 | 100 | 90 |
| C* | 100 | 100 | 100 | 100 | 90 | 100 |
| D* | 100 | 90 | 100 | 100 | 90 | 100 |
| E* | 90 | 100 | 90 | 100 | 90 | 90 |
| A** | 100 | 90 | 90 | 90 | 90 | 90 |
| B** | 90 | 90 | 100 | 90 | 100 | 80 |
| C** | 100 | 100 | 90 | 100 | 90 | 100 |
| D** | 100 | 90 | 90 | 90 | 90 | 100 |
| E** | 90 | 100 | 90 | 100 | 90 | 90 |
| MEAN AT TEST END | 96 | 94 | 92 | 94 | 92 | 92 |
| CV %+ | 5.71 | 5.83 | 4.86 | 5.83 | 4.86 | 9.10 |

*24 hour test;
**48 hour test;
+Coefficient of Variation = Standard Deviation x 100/mean.

The biotoxicity test of *Mysidopsis bahia* survival with the addition of various concentrations of neutralized low pH acidic composition passed all required quality assurance parameters. The LC50 value was not reached with 100 mg/L concentrations, indicating that the LpHAC is nontoxic to a marine environment, one of the more sensitive environments on Earth.

Table III below records the results of the biotoxicity test of the low pH acidic composition with regard to the marine organism *Menidia beryllina*.

TABLE III

Menidia beryllina Survival

| REPLI-CATE | PERCENT SURVIVAL | | | | | |
|---|---|---|---|---|---|---|
| | 0 mg/L | 10 mg/L | 18 mg/L | 32 mg/L | 56 mg/L | 100 mg/L |
| A* | 90 | 100 | 100 | 100 | 100 | 100 |
| B* | 100 | 100 | 100 | 100 | 100 | 90 |
| C* | 100 | 100 | 100 | 100 | 100 | 100 |
| D* | 100 | 100 | 100 | 100 | 100 | 100 |
| E* | 100 | 100 | 100 | 100 | 100 | 100 |
| A** | 90 | 100 | 100 | 100 | 100 | 100 |
| B** | 100 | 100 | 90 | 100 | 100 | 90 |
| C** | 100 | 90 | 100 | 100 | 100 | 100 |
| D** | 100 | 100 | 90 | 100 | 100 | 100 |
| E** | 100 | 100 | 100 | 90 | 100 | 100 |
| A*** | 90 | 100 | 100 | 100 | 90 | 90 |
| B*** | 100 | 100 | 90 | 100 | 100 | 90 |
| C*** | 100 | 90 | 90 | 100 | 100 | 100 |
| D*** | 100 | 100 | 90 | 90 | 100 | 100 |
| E*** | 100 | 90 | 100 | 90 | 100 | 100 |
| A**** | 90 | 100 | 100 | 90 | 90 | 90 |
| B**** | 100 | 100 | 90 | 100 | 100 | 80 |
| C**** | 100 | 90 | 90 | 100 | 100 | 100 |
| D**** | 90 | 90 | 90 | 90 | 100 | 100 |
| E**** | 100 | 90 | 100 | 90 | 90 | 100 |
| MEAN AT TEST END | 96 | 94 | 94 | 94 | 96 | 94 |
| CV %† | 5.71 | 5.83 | 5.83 | 5.83 | 5.71 | 9.51 |

*24 hour test;
**48 hour test;
***72 hour test;
****96 hour test
†Coefficient of Variation = Standard Deviation × 100/mean.

The biotoxicity test of *Menidia beryllina* survival with the addition of various concentrations of neutralized low pH acidic composition passed all required quality assurance parameters. The LC50 value was not reached with 100 mg/L concentrations, indicating that the LpHAC is nontoxic in one of the more sensitive environments on planet Earth.

In Examples 2 and 3 below, fire assaying is used in the quantitative determination of metal or metals that are separated from impurities by fusion processes and weighed in order to determine the amount present in the original sample.

Metals recovered in fire assaying are the metals that emerge from the fusion of the material in an assay furnace, for gold, usually at temperatures of about 1100° C. (2000° F.). The Fire Assay Method is centuries old, but it is still one of the most reliable methods for performing assays (to determine the metal content of an ore) of ores that contain precious (noble) metals—Gold, Silver and Platinum. Ore from the mine, or exploration sampling program is scientifically sampled using a statistically accurate method fitting the desired accuracy, it is then prepared by crushing, splitting and pulverizing. This is a process referred to as sample preparation.

Example 2

Gold Recovery Using Flotation Concentrate Oxidized in Autoclave

Two samples of head ore each having a sample mass of 100 grams are subjected to fire assay to determine the amount of gold (Au) present in each head ore sample. Two samples of residue from the head ore samples are treated with a traditional cyanide leaching process known as carbon-in-leach (CIP) to recover gold. Two samples of residue from the same head ore samples are treated with the four-component lixiviant of the present invention. For each sample the leach time is 25 hours. The sodium cyanide (NaCN) concentration is 1 gram per liter (1 gm/L). The volume of four-component lixiviant used for the leaching process is 250 milliliters (ml).

The three-component lixiviant of the present invention was substituted for the cyanide solution in the process and comparable results were achieved without any optimization of the process parameters. The results of the fire assay determination of gold (Au) content in each sample ore and each residue sample is shown in the Table IV below.

TABLE IV

Fire Assay Results of Flotation Concentrate/Oxidation Samples

| | SAMPLE | | | | | |
|---|---|---|---|---|---|---|
| | Head Ore #1 | Head Ore #2 | Residue CN #1 | Residue CN #2 | Residue LpHAC + 2 | Residue LpHAC + 3 |
| Au Content in g/ton | 2.90 | 2.83 | 2.19 | 2.24 | 2.26 | 2.21 |

The average gold (Au) content in the two samples of head ore is 2.86 grams per ton (g/t). The average gold (Au) in the two residue samples treated with cyanide (CN#1 and CN#2) is 2.22 g/t; and the average gold (Au) content in the two residue samples treated with LpHAC+2 and LpHAC+3 is 2.24 grams per ton (g/t).

The ore is first concentrated by flotation, then the concentrate is oxidized in an autoclave vessel for 12-16 hours at 180° C. and at 400 psi pressure; then the oxidized concentrate from the autoclave is subjected to cyanide leaching in CIP process. It is expensive and complex; i.e. three steps, processing and the efficiency is considered low.

The cyanide solution leaching recovered 22.4% of gold after flotation/oxidation and leaching; the three-component lixiviant (LpHAC+2) recovered 21:7% of gold in the residue samples.

Thus, without any optimization of the process parameters, LpHAC+2 provides a promising lixiviant that is not an irritant or deleterious to humans and the environment; the lixiviant is also an environmentally friendly replacement for the toxic cyanide solutions used in hydrometallurgical/extractive metallurgy industry.

Example 3

Gold Recovery by Autoclave Pressure Leaching

Two samples of head ore having a mass of 250 grams each were analyzed by fire assay to determine the gold content in each. Two samples of the residue from the head ore samples were treated with 1000 ml of an aqueous solution of a three-component lixiviant of low pH acid, potassium chloride and water, wherein the LpHAC has a concentration of 10 weight percent of the aqueous solution. The 1000 ml of lixiviant is added to an autoclave pressure leaching/oxidation reaction vessel containing head ore residue to recover gold. The autoclave temperature was 95° C., pressure was 100 pounds per square inch (psi) and the leach time was 3 hours. After autoclaving the pH of the pregnant lixiviant is measured and determined to be pH 1.9.

The results of the fire assay determination of gold (Au) content in the sample ore and residue for Example 3 is shown in the Table V below.

TABLE V

Fire Assay Results of Autoclave Pressure Leaching/Oxidation Samples

| | SAMPLE | | | |
|---|---|---|---|---|
| | Head Ore #3 | Head Ore #4 | Residue #5 | Residue #6 |
| Au Content in ppm | 3.642 | 0.106 | 0.499 | 0.297 |
| Au Content in opt | 2.871 | 0.083 | 0.297 | 0.009 | ppm = parts per million; opt = troy ounces per short ton

The average gold (Au) content in the two samples of head ore is 0.945 troy ounces per short ton. The average gold (Au) in the two residue samples is 0.0115 troy ounces per short ton (opt).

After autoclave pressure leaching with the lixiviant of the present invention the gold (Au) recovery from the two residue samples was 87.83 percent.

Example 3 provides a significant cost saving and efficiency over the three-step process in Example 2 that begins with the flotation concentrate that is oxidized. Both the temperature and pressure used in Example 2 are reasonably high and create special considerations and increased costs. Also, the time duration in Example 2 is 4 to 5 times longer that the leach time in Example 3 and the metal recovery is accomplished at a much lower temperature and pressure.

Thus, Example 3 demonstrates that LpHAC+2 can be used in a one step (oxidation and leaching) process with a recovery rate of 87.83%. The LpHAC+2 lixiviant is used directly on the ore without using flotation for concentration, thus simplifying the process tremendously and also reducing the associated operational and production costs.

Second Embodiment

In a second embodiment, there are four-components that form the aqueous lixiviant, namely, a low pH acid composition of matter, an alkali metal salt, a mineral acid having a pH of less than 2 and water used in the weight ratios shown in Table VI below.

TABLE VI

| Composition of LpHAC + 3 | | |
|---|---|---|
| Compound | Weight Percent Range | Preferred Weight Percent |
| Low pH acid product (LpHAC) | 10-40 | 15 |
| Potassium chloride (KCl) | 5-28 | 5-18 |
| Mineral acid (pH < 2) | 1-25 | 5-8 |
| Water | 7-84 | 59-80 |

The first component in the four-component mixture is approximately 10 weight percent of the low pH acid prepared by the process disclosed in U.S. Pat. Nos. 5,989,595 and 6,242,011 B1 to Cummins which shows no toxicity when, neutralized with sodium hydroxide as shown in Example I above.

The second component in the four-component aqueous lixiviant is an alkali metal salt added in a preferred concentration range from approximately 5 weight percent to approximately 18 weight percent of the total solution and is selected from at least one of an alkali metal chloride or an alkali metal sulfate, most preferably the alkali metal salt is potassium chloride.

The third component in the four-component aqueous lixiviant is an acid having a pH of less than 2, used in a concentration range between approximately 1 weight % and approximately 25 weight %, preferably between 5 weight % and approximately 8 weight %. The addition of an acid with a pH of less than 2 increases the ionization potential of the solution as may be required by different ores with different properties and metal purities. The acids include, but are not limited to, nitric, hydrofluoric, hydrochloric, fumeric and the like. A person skilled in the art can make a judicious selection of an acid and appropriate concentration range for metal extraction based on the different ore properties. It was determined that the addition of an acid with a pH of less than 2 to the other components provides a lixiviant that is not detrimental to the environment and not harmful to human tissue and in many cases performs better than cyanide based lixiviants in metal extraction processes.

In general, me extraction process used in Examples 4 and 5 includes adding the four-component lixiviant to the sample aggregate until a slurry is formed. Then the slurry is mixed continuously to keep the solids suspended within the liquid. A charge is sent to me slurry between 0.5 volts and 20 volts, with a target of 1.34 volts for gold and higher for other precious metals when required to be extracted from the ore. A person skilled in the art can make a judicious selection of the appropriate voltage for metal extraction based on the different ore properties and predetermined voltages to be used in the extraction of specific metals.

Example 4

Gold Extraction from California Ore Sample

A 44 kilogram (20 pound) sample of aggregate that had been pre-processed using cyanide and mercury to extract as much gold as possible from the ore was received for processing with the lixiviant of the present invention. The ore was a granite/shale with black sand and iron pre with relatively low sulfur content.

The sample was ground using a laboratory grinder to a 100 mesh screen size, approximately the size of beach sand. The material was mixed thoroughly and a sample was collected to represent the starting value for the gold content of the ore.

A 0.53 gram (15 ounce) sample the prepared soil was collected for treatment in a mechanical tumbler along with 200 ml of the lixiviant (pHAC+3). The slurry was then tumbled for a period of 12 hours and treated with a predetermined charge of electrical current, a current of 1.34 Volts, the voltage for the extraction of gold. Considerable chemical agitation was observed in the tumbler early in the chemical interaction.

At the end of 12 hours, the probes were covered with mineral deposits; a sample of the soil was extracted from the liquid and sent for analysis using Inductively Coupled Plasma (ICP) mass spectrometry utilizing an aquaria solution (nitric acid, salt and a heavy oxidizer—HCL) according to proper sample preparation methodologies.

The ICP tests confirm that the gold content of the original ore sample was 14 g (0.5 oz) per ton of ore. The data determined that the lixiviant of the present invention extracted gold with an efficiency of greater than 90%. The treated soil gold content was below detection limits. Gold and an unrecorded amount of mercury were deposited on the charged probes. Table VII below shows the results of gold extraction.

TABLE VII

Extraction of Gold from Pre-Processed California Ore

| Sample ID | Lab No. | Lixiviant | Gold Content | Pt Content | % Recovery |
|---|---|---|---|---|---|
| B-1 | E-4080-1 | None | 0.14 | <0.10 | Control |
| A-1 | E-4080-2 | LpHAC + 3 | ≦0.10 | <0.10 | 90% |

The gold is deposited on the electrode primarily with a low level remaining in solution. The process has extremely low environmental impact and does not use cyanide. Table VII shows that the extraction was complete as shown by samples B-1 and A-1. The detection limits of an ICP test is ≦0.10 ppm (mg/Kg), which translates that any amount below or less than ≦0.10 ppm is classified as clean or non-detectable. Both B-1 and A-1 sample results were below detection-limits, which demonstrated the complete recovery of gold from the ore in the treatment process.

Example 5

Gold Extraction from Colorado (G5 Site) Ore Sample

A 22 kilogram (10 pound) sample of aggregate that had been stamp pressed to a size ranging between 0.01 cm (0.31 inch) and 0.05 cm (0.125 inch) and had undergone no pre-processing using any chemicals or heat treatments was received for processing with the lixiviant of the present invention. The ore was highly sulfonated with iron pyrite and large amount of quartz and garnets present.

The 22 kg (10 lbs.) of material was mixed thoroughly and a 4.4 kg (2 lb.) sample was collected in a container. A 400 g sample of the raw ore was collected for treatment in a mechanical tumbler along with 400 ml of the lixiviant (pHAC+3). The slurry was then agitated and tumbled for a period of 12 hours and treated with a predetermined charge of electrical current, a current of 1.34 Volts, the voltage for the extraction of gold.

At the end of 12 hours, a sample of the ore was extracted from the liquid and sent for analysis using X-ray tests according to proper sample preparation methodologies and lixiviants run through Inductively Coupled Plasma (ICP) mass spectrometry.

The X-ray tests confirm that the gold content of the original ore sample (E4086-1) was 32.2 mg/kg which equates to 1.135 oz. of gold per metric ton. The data also determined that the lixiviant extracted gold with an efficiency of greater than 96.5% with all gold deposited on the electrode. The X-ray test of the solid ore sample (E4086-2) showed 1.1 mg/kg (approximately 0.33 oz per ton) of unrecovered gold after processing which means, gold left in the ore. The liquid lixiviant with unrecovered gold (E4086-5) was run through an ICP test to reveal 1.68 mg/kg of gold left in the lixiviant that was not recovered on the electrode.

An accuracy/variance test was run to show the variance of result output from the X-ray testing. A known quantity of gold (2.90 mg/kg) was tested using the X-ray tests to confirm gold content. A second test on the same known quantity of gold was tested and revealed a result of 3.90 mg/kg, thus it was determined that the variance of the results is less than or equal to 1.0 mg/kg.

Example 5 shows the extraction Of gold from a highly sulfonated ore at a level of approximately 97% recovery. The gold is deposited on the electrode primarily with a low level remaining in solution. The process has extremely low environmental impact and does not use cyanide.

The present invention in two embodiments provides an improved lixiviant for the extraction of metal ions, particularly precious metal ions, from metal containing ores from a variety of sources. The low toxicity, non-caustic nature of the combination of acidic materials was an unexpected and surprising result in the preparation of the novel lixiviant of the present invention. It was also surprising that the use of the material along with subjecting the ore to physical changes, such as ore sizing and voltage, resulted in the extraction of targeted precious metals from a variety of ores, including a highly sulfonated refractory ore, wherein the extraction was between 90 and 97 percent of the precious metal from the ore.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An improved process for the recovery of metal from a metal-containing ore, soil or rock, comprising the steps of:
   a) selecting a metal-containing ore;
   b) crushing the metal-containing ore to form a powder;
   c) conveying the powder to a mixing vat;
   d) adding an amount of a three-component lixiviant that consists of:
      d-i) a liquid that is not an irritant or deleterious to humans and the environment, prepared by a process of combining a high purity acid selected from at least one of phosphoric acid, fumaric acid or acetic acid with water selected from at least one of deionized water and filtered water and an ammonium compound selected from at least one of anhydrous ammonia and buffered ammonium nitrate used in a ratio of approximately 1 lb, to approximately 5 lbs, of ammonium compound per gallon of water, heating the mixture to approximately 140° F. to form mixture (I), placing mixture (I) in a pressurized vessel and heating the mixture to temperatures in a range between approximately 250° F. and approximately 400° F., then cooling the mixture, after the mixture is cooled, adding a stabilizing amount of the starting mixture (I) forming a low pH acid (LpHAC) product that is not an irritant, d-ii) a metal salt selected from at least one of potassium chloride, potassium sulfate, magnesium chloride, magnesium sulfate, calcium chloride, calcium sulfate, manganese chloride, manganese sulfate, sodium chloride, sodium sulfate, ammonium chloride, ammonium sulfate, ammonium bisulfate, and d-iii) water selected from at least one of fresh water, sea water, brine, and a mixture thereof to form an aqueous metal extracting lixiviant;

e) forming a slurry of the metal containing ore powder and metal extracting lixiviant;

f) extracting metals from the slurry to form a pregnant liquid and a solid residue;

g) conveying the pregnant liquid and solid residue to a solid/liquid separator;

h) removing solids from the pregnant liquid and solid residue of step f);

i) directing the pregnant liquid of step g) to a metal recovery unit; and j) collecting between approximately 85% to approximately 97% of total metal in the ore.

2. The process of claim 1, wherein the metal-containing ore contains at least one of copper, silver, gold, platinum, uranium, and rhodium.

3. The process of claim 2, wherein the metal-containing ore contains gold.

4. The process of claim 2, wherein the metal-containing ore contains copper.

5. The process of claim 1, wherein the metal salt is potassium chloride.

6. The process of claim 1, wherein the step of crushing the metal-containing ore by use of at least one of a rock crusher and a ball crusher.

7. The process of claim 1, wherein the step of collecting metal includes at least one of filtering, centrifuging, electrolysis, and fluid bed extractor.

8. The process of claim 1, wherein the ratio of three-component lixiviant to water in the aqueous slurry is in a range of from approximately 10% to approximately 90% lixiviant and approximately 90 weight % to approximately 10 weight % water.

9. The process of claim 1, wherein the metal recovery unit is selected from at least one of a centrifuge, electrolysis unit, molecular sieve, and fluid bed extractor.

10. The process of claim 9, wherein the metal recovery unit is an electrolysis unit.

11. A composition of matter that is a three-component lixiviant consisting of:

a) a liquid that is not an irritant or deleterious to humans and the environment, prepared by a process of combining a high purity acid selected from at least one of phosphoric acid, fumaric acid or acetic acid with water selected from at least one of deionized water and filtered water and an ammonium compound selected from at least one of anhydrous ammonia and buffered ammonium nitrate used in a ratio of approximately 1 lb, to approximately 5 lbs, of ammonium compound per gallon of water, heating the mixture to approximately 140° F. to form mixture (I), placing mixture (I) in a pressurized vessel and heating the mixture to temperatures in a range between approximately 250° F. and approximately 400° F., then cooling the mixture, after the mixture is cooled, adding a stabilizing amount of the starting mixture (I) forming a low pH acid (LpHAC) product that is not an irritant, b) an alkali metal salt selected from at least one of an alkali metal chloride and an alkali metal sulfate; and c) water selected from at least one of fresh water, sea water, brine, and a mixture thereof to form an aqueous metal extracting lixiviant.

12. The composition of matter of claim 11, wherein the alkali metal chloride is potassium chloride.

13. An improved process for the recovery of metal from a metal-containing ore, soil or rock, comprising the steps of:

a) selecting a metal-containing ore;

b) crushing the metal-containing ore to form a powder;

c) conveying the powder to a mixing vat;

d) adding an amount of a four-component aqueous lixiviant that consists essentially of d-i) water selected from at least one of fresh water, sea water, brine, and a mixture thereof, d-ii) a liquid, non-irritant, low pH acidic composition (LpHAC) prepared by a process of combining a high purity acid selected from at least one of phosphoric acid, fumaric acid or acetic acid with water selected from at least one of deionized water and filtered water and an ammonium compound selected from at least one of anhydrous ammonia and buffered ammonium nitrate used in a ratio of approximately 1 lb. to approximately 5 lbs. of ammonium compound per gallon of water, heating the mixture to approximately 140° F. to form mixture (I), placing mixture (I) in a pressurized vessel and heating the mixture to temperatures in a range between approximately 250° F. and approximately 400° F., then cooling the mixture, after the mixture is cooled, adding a stabilizing amount of the starting mixture (I) forming a low pH acid (LpHAC) product that is not an irritant, d-iii) an alkali metal salt selected from at least one of a alkali metal chloride and an alkali metal sulfate, and d-iv) an acid having a pH of less than approximately 2, to form an aqueous metal extracting lixiviant;

e) forming a slurry of the metal containing ore powder and metal extracting lixiviant;

f) extracting metals from the slurry to form a pregnant liquid and a solid residue;

g) conveying the pregnant liquid and solid residue to a solid/liquid separator;

h) removing solids from the pregnant liquid and solid residue of step f);

i) directing the pregnant liquid of step g) to a metal recovery unit; and j) collecting between approximately 85% to approximately 97% of total metal in the ore.

14. The process of claim 13, wherein the metal-containing ore contains at least one of copper, lead, molybdenum, cadmium, nickel, silver, cobalt, zinc, gold, platinum, uranium, rhodium, and aluminum.

15. The process of claim 14, wherein the metal-containing ore contains gold.

16. The process of claim 14, wherein the metal-containing ore contains copper.

17. The process of claim 13, wherein the alkali metal salt is potassium chloride.

18. The process of claim 13, wherein the acid with a pH of less than 2 is selected from at least one of nitric acid, hydrofluoric acid, hydrochloric acid, fumeric acid, and mixtures thereof.

19. The process of claim 18, wherein the acid with a pH of less than 2 is nitric acid.

* * * * *